United States Patent [19]

Hodge

[11] E Re. 29,494

[45] Reissued Dec. 13, 1977

[54] TRASH CONTAINER LID SYSTEM

[76] Inventor: Allan M. Hodge, 5852 Lomond Drive, San Diego, Calif. 92120

[21] Appl. No.: 754,604

[22] Filed: Dec. 27, 1976

Related U.S. Patent Documents

Reissue of:

[64] Patent No.: 3,836,036
Issued: Sept. 17, 1974
Appl. No.: 330,569
Filed: Feb. 8, 1973

[51] Int. Cl.[2] ..... B65D 73/02; B65D 85/42

[52] U.S. Cl. ..... 220/334; 220/1 R; 214/302; 294/73

[58] Field of Search ..... 220/334, 335, 1 R, 331; 214/302, 303; 294/73; 217/60

[56] References Cited

U.S. PATENT DOCUMENTS

| | | | |
|---|---|---|---|
| 3,136,575 | 6/1964 | Kolling | 220/1 R X |
| 3,567,062 | 3/1971 | Reed | 220/335 |

*Primary Examiner*—George T. Hall
*Attorney, Agent, or Firm*—Poms, Smith, Lande & Glenny

[57] ABSTRACT

A trash container lid system for placement on top of large industrial trash bins of the type utilized in hotels, apartment houses, etc., in which a lid section having a raised back portion is axially and rotatably coupled to the trash bin via an elongated aperture allowing a rear bottom curved surface of the lid assuming a stabilized partially open position, the extreme back portion of the lid carrying a counterweight throughout a predetermined arch for ease in opening, and the contacting surfaces between the trash bin and the lid having a vapor seal, the lid assembly consisting of a metal frame carrying a removable plastic liner therein.

27 Claims, 12 Drawing Figures

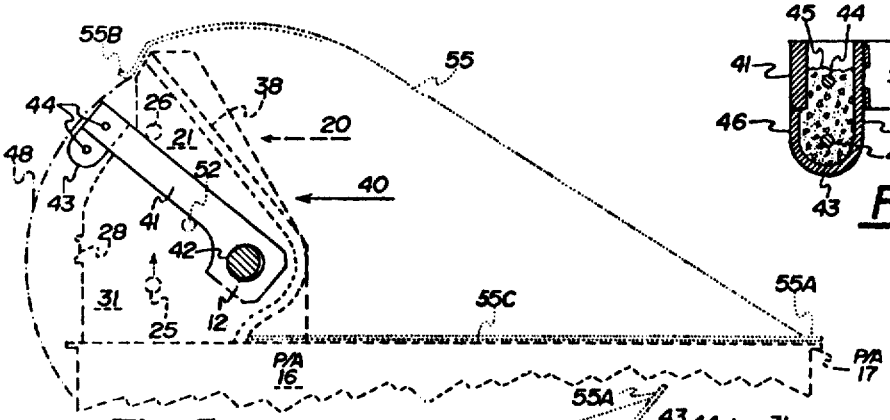
Fig. 5
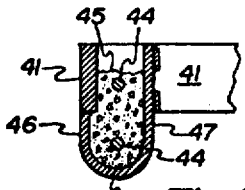
Fig. 7
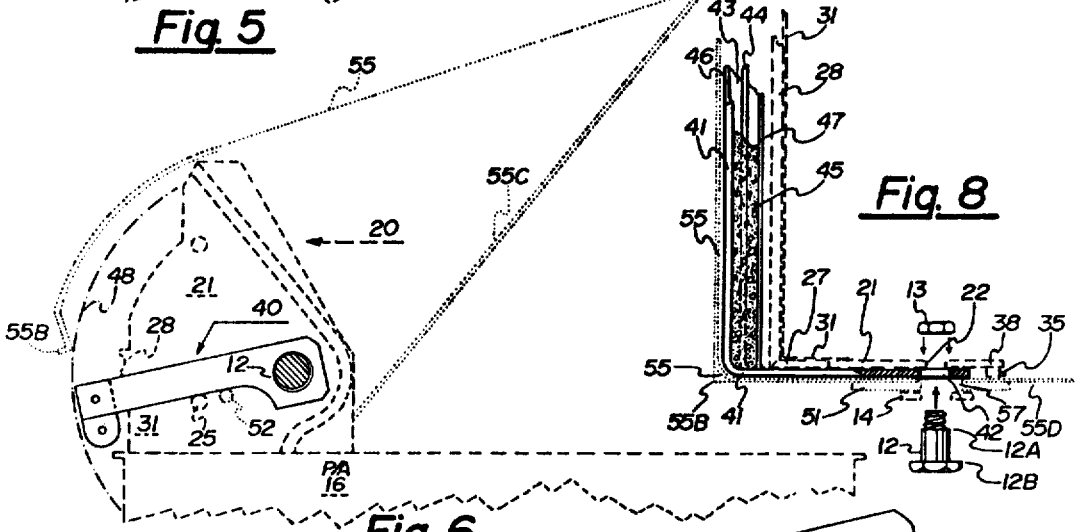
Fig. 8
Fig. 6
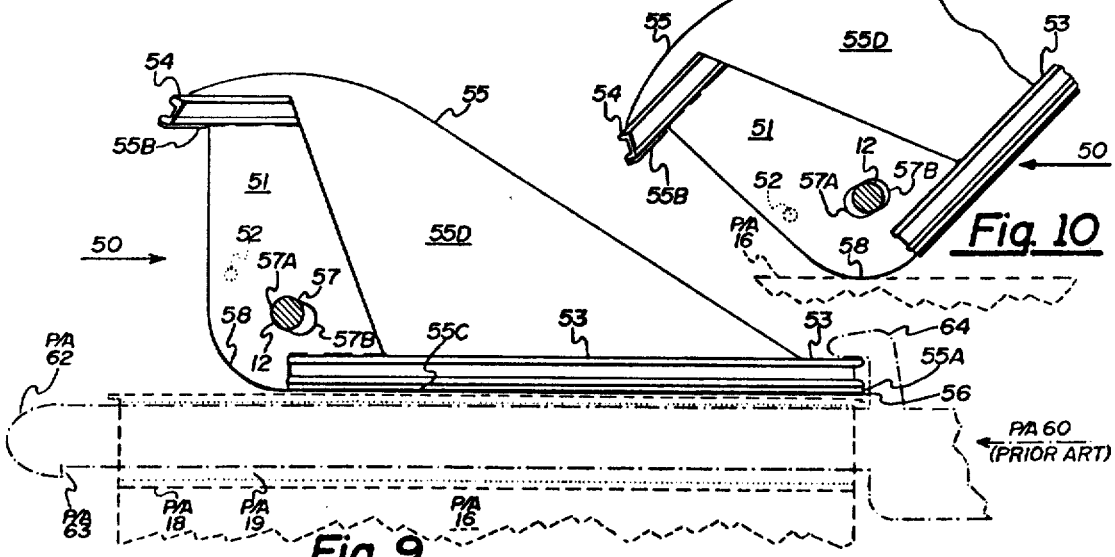
Fig. 10
Fig. 9

TRASH CONTAINER LID SYSTEM

Matter enclosed in heavy brackets [ ] appears in the original patent but forms no part of this reissue specification; matter printed in italics indicates the additions made by reissue.

BRIEF DESCRIPTION OF THE INVENTION

The present invention relates to a trash container lid assembly, and more particularly to a trash container lid assembly having a stabilized partially open position.

According to the invention, a trash container lid assembly is provided having a raised back portion which is rotatably coupled to the trash bin via an elongated aperture or slots and axles. The elongated slot allows the axis of rotation of the bin lid to shift after a partial opening which further allows a curved surface at the rear bottom section of the lid to contact the top of the bin, resulting in a stabilized partially opened position of the lid. This facilitates the depositing of garbage or trash without the necessity of simultaneously holding the lid open. The trash containers or bins that the lid is designed for are the large commercial bins utilized in apartment houses, hotels, restaurants, etc., and normally have lift pocket tubes along their sides for receiving the lifting forks of a garbage truck which lift the entire assembly over the cab of the truck, inverting it and allowing the lid assembly to swing open and the trash to fall into the truck bed. Further features of the instant invention are the utilization of a counterweight asembly which shifts through a portion of the lid assembly's arch of rotation and a vapor seal sealing the mating surfaces of the trash bin assembly and the lid assembly.

An object of the present invention is the provision of an improved trash container lid assembly.

Another object of the invention is the provision of a trash container lid assembly having a stabilized partially open position.

A further object of the invention is the provision of an improved trash container lid assembly utilizing a counterweight.

Yet another object of the present invention is the provision of a trash container lid assembly having a removable plastic liner.

A still further object of the invention is the provision of a trash container lid assembly having a vapor seal.

Other objects and many of the attendant advantages of the invention will be readily appreciated as the same becomes better understood by reference to the following detailed description when considered in connection with the accompanying drawings in which like reference numerals designate like parts throughout the Figures thereof and wherein:

FIG. 5 is a side elevation illustrating the counterweight feature of the invention with the lid section closed;

FIG. 6 is a side elevation of the structure of FIG. 1 with the lid opened;

FIG. 7 is a sectional view of the counterweight;

FIG. 8 is a top view of the counterweight and pivot pin assembly partially sectioned;

FIG. 9 is a side elevation of the lid assembly in the down position;

FIG. 10 is a side elevation of the lid assembly in its open position;

DETAILED DESCRIPTION OF THE DRAWINGS

Figure 1:
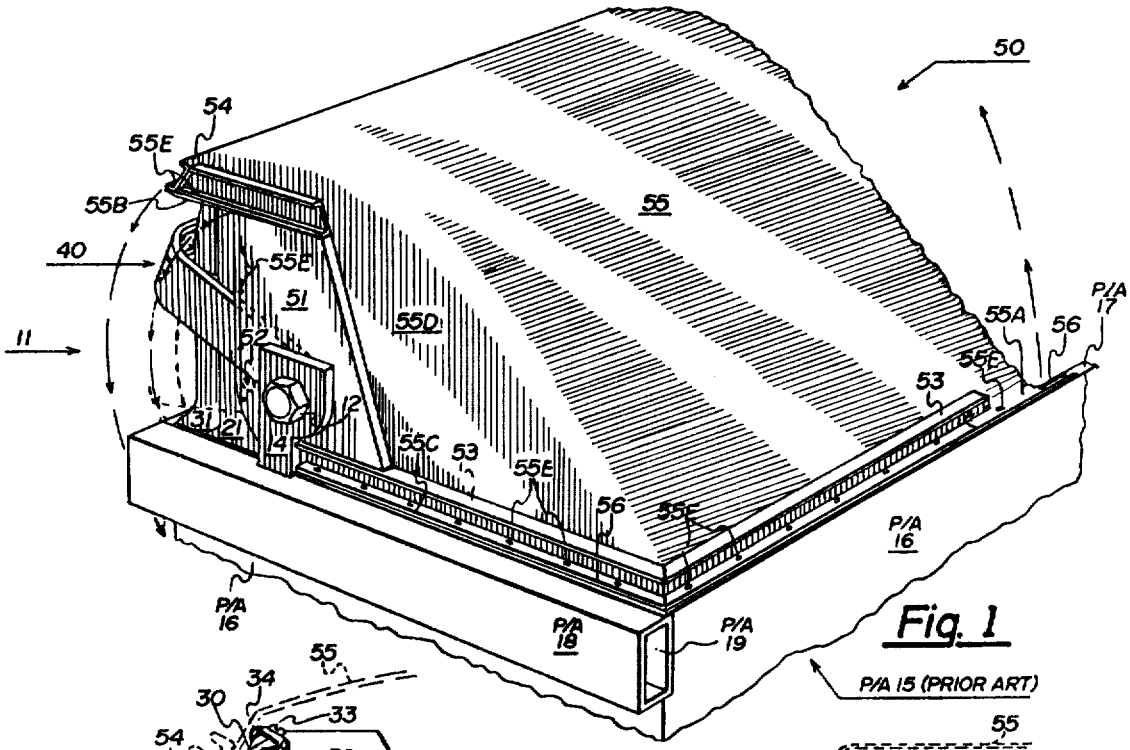
FIG. 1 is a perspective cutaway view of the lid assembly in situ.

Referring to FIG. 1, the lid and mounting assemblies are shown generally at 11 rotatably coupled by pivot bolt 12 to outboard pivot support 14 which is fixedly attached as by welding to prior art trash container 15. It is pointed out that on the drawing the prior art implements are identified as p/a. Trash bin 15 has sides 16 with upper side ledges 17 and lift pocket tube 18 having a continuous inner aperture 19. Inner mounting plate 21 is also fixedly attached to trash container 15 as by welding. Rear plastic liner 31 is coupled to inner mounting plate 21 and to trash bin 15. Counterweight assembly 40 is also rotatably mounted at pivot bolt 12 and will be described with reference to other figures. Rotating lid assembly 50 consists of a pivot plate 51 carrying a counterweight engagement pin 52 (to be described later). Frame members 53 and 54 couple to the top and bottom portions as by welding to pivot plate 51 and a plastic lid liner 55 which is coupled to the frame members at front lid edge 55A, rear ledge 55B, side lid ledge 55C. The plastic lid side 55D is sealed against inner mounting plate 21 by a wiping seal which will be described below. The plastic liner is attached at screw locations 55E to frame members 53 and 54. Lid edge seal 56 is coupled to the bottom of the plastic liner ledges 55A and 55C.

Figure 2:
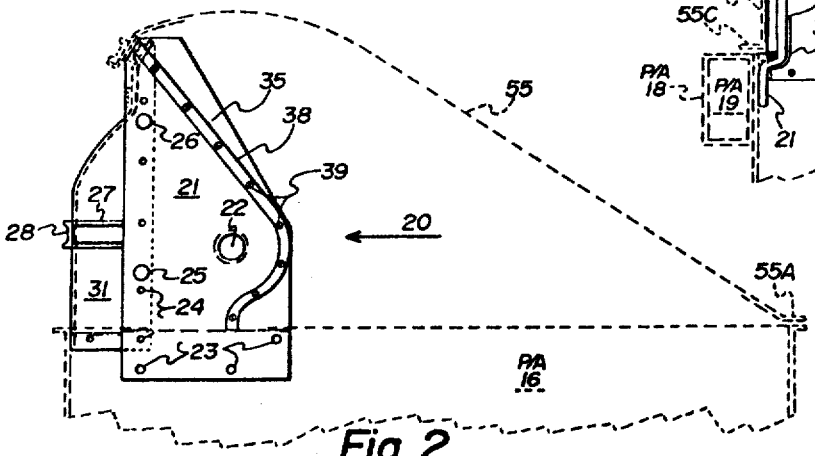
FIG. 2 is a side elevation of the interior structure of the embodiment of FIG. 1.

Referring to FIG. 2, the inner mounting assembly is shown generally at 20 which would be seen by cutting the assembly of FIG. 1 vertically in half and looking toward the pivot corner not illustrated in FIG. 1 which, of course, is identical thereto. Inner mounting plate 21 has a threaded aperture 22 for receiving pivot bolt 12 (FIG. 1). Mounting holes 23 are utilized for bolting inner mounting plate 21 to side 16 of trash bin 15. Apertures 24 are mounting holes for rear plastic liner 31. Lower stop pin 25 and upper stop pin 26 are utilized with counterweight assembly 40 (FIG. 1), which will be described below. Side support member 28 supports rear plastic liner 31. Wiper seal 35 is attached by wiper screws 36 and wiper retainer strip 37 to wiper standoff bar 38 which, in turn, is attached to inner mounting plate 21 by standoff screws 39. Plastic lid liner 55, together with front lid ledge 55A, are shown by dotted lines.

Figure 3:
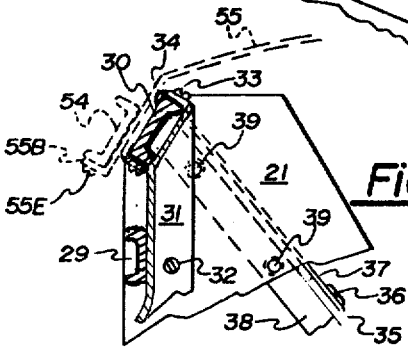
FIG. 3 is a side elevation partially sectioned of an upper portion of the interior structure of the embodiment of FIG. 1.
Figure 4:
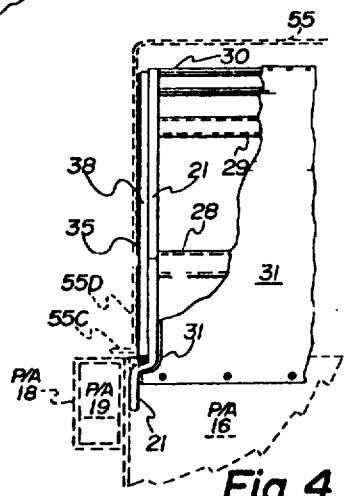
FIG. 4 is a front elevation of a section of the upper back portion of the embodiment of FIG. 1 partially broken away.

Referring to FIG. 3, inner mounting plate 21 is shown with intermediate support member 29 and upper attachment 30 supporting rear liner 31 which is held to inner mounting plate 21 by side attachment screws 32 and to upper attachment 30 by upper attachment screws 33 which also position and retain upper seal stop 34 which seals against the inner surface of plastic lid liner 55 which is also sealed by wiper seal 35.

Referring to FIGS. 5, 6 and 7, counterweight arm 41 has a bearing lined pivot aperture 42 for cooperation with pivot bolt 12 and a weight saddle 43 with steel reinforcing bars imbeded in counterweight material 45 such as cement which is contained by rear saddle wall 46 and front saddle wall 47 which are welded at each end to counterweight arm 41. The line of arcuate motion of lid ledge 55B is illustrated at 48. Lower stop pin 25, upper stop pin 26, and counterweight engagement pin 52 are all illustrated with reference to pivot arm 41 when lid 55 is in the closed position in FIG. 5 and in the open position in FIG. 6.

Referring to FIG. 8, pivot bolt 12 has a shoulder 12A and a bolthead 12B. The distance between shoulder 12A and bolthead 12B is slightly larger than the difference between the outer surface of inner mounting plate 21 and the outer surface of outboard pivot support 14 so that none of the moving parts are squeezed when the retaining lock nut 13 is cinched upon pivot bolt 12. Pivot slot 57 in pivot plate 51 has an upper rear rounded edge 57 and a lower front rounded edge 57B when the lid assembly 50 is in the closed position, as shown in FIG. 9. When pivot bolt 12 is riding against upper rear rounded edge 57A, a separation is created between trash container 16 and arcuate drag surface 58 of pivot plate 51. However, when the lid is raised (FIG. 10), lid assembly 50 slips down on bolt 12 and surface 58 contacts the top surface of bin 16 to create a frictional stability holding the lid in this partially opened position.

The counterweight assembly consisting of a U-shaped member 41 which stands at the near and far side of the trash container as shown in FIGS. 5, 6, 7 and 8, contains a bushed hole 42 for cooperative engagement with the pivot bolt 12. A plurality of reinforcing steel rods 44 run from one side of the counterweight arm 41 to the opposite side as shown in FIGS. 5, 7 and 8. A weight saddle 43 is positively coupled to arm 41 by welding of a rear section 46 to the arm 41 at the outer surface as shown in FIG. 7, and an inner wall for the weight saddle 43 is created by welding 47 to the arm 41 at both ends of the "U" and near the face of the "U" shape. The counterweight can be considered as a free pivoting body around pivot bolt 12, however, this free motion is limited by lower stop pin 25 which projects outward from inner mounting plate 21 and prohibits counterweight assembly 40 from impinging on the trash container from prior art 16. The counterweight motion is similarly limited when the system is inverted, as in the FIG. 11, by upper stop pin 26 which also projects outwardly from inner mounting plate 21. A counterweight engagement pin 52 projects inward from the end plate 51 of lid assembly 50 through the plastic lid side 55D and stops short of contact with the inner mounting plate 21.

When the lid is closed as in FIG. 5, this counterweight engagement pin 52 is underneath the counterweight arm 41 and the counterweight is acting by virtue of gravity to raise the lid assembly 50. In normal use, the lid assembly would be heavier at its edge 55A than the effect of counterweight 40 and the lid would remain closed, however, it could be opened with minor energy to the position shown in FIG. 6. At the point of raising the lid, as shown in FIG. 6, the counterweight is supported by lower stop pin 25 and any further effort to raise the lid would not be assisted by the counterweight effect because counterweight engagement pin 52 would move away from the counterweight in a counterclockwise direction around pivot bolt 12.

With reference to FIGS. 5, 6 and 8, a clearance zone exists between the rear members of inner mounting assembly 20 and between the circular line of motion of lid edge 55B shown as arch 48. These clearances and figures appear in FIG. 8 to illustate the total freedom of motion without interference in the system. The bushed hole 42 in the counterweight arm 41 is appreciably wider than the thickness of metal comprising the arm and provides a non-scraping clearance for the arm and the counterweight itself. Counterweight material 45 may be any material of reasonably high density such as lead, brass, or concrete (as shown). By virtue of its open upper construction, the weight saddle may be filled to any convenient level and could even be filled so deeply that it would retain the lid in open position (shown in FIG. 6). In this latter case, a latch would be required to hold the front lid edge against the upper wall edge 17 of the prior art trash container 16.

Figure 11:
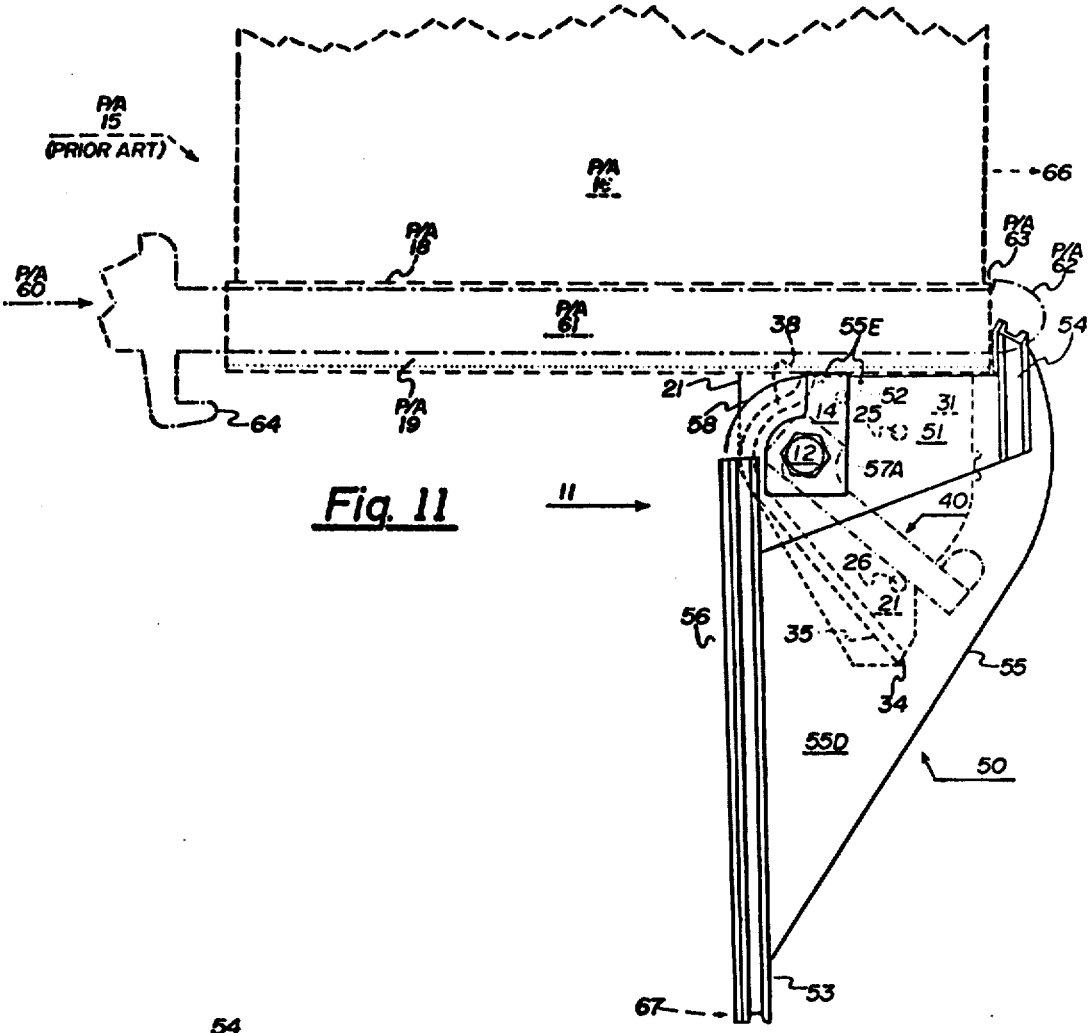
FIG. 11 is a side elevation of the lid assembly inverted for dumping.

Referring to FIGS. 9 and 11, a prior art pickup assembly 60 consists of a fork 61 with a rounded nose 62 and a slide stop 63. A lid retaining hook 64 overlaps front lid frame 53 (FIG. 9). This assembly is shown being received by lift pocket aperture 19 and lift pocket tube 18. If the insertion is complete the container will slip down and to the right as pickup assembly 60 is lifted and rotated 180° clockwise to invert the container over the bin of the dump truck. When the pickup assembly reaches an inverted horizontal position and abruptly stops, container 16 slides out (as shown at 66 in FIG. 11), being stopped by slide stop 63. This slides lid frame member 53 free of hook 64 and allows the lid to drop down along path 67 to empty the contents. Since the rear upper end 57A of pivot slot 57 is in contact with pivot bolt 12, there is no drag between surface 58 and the top of bin 16.

Figure 12:
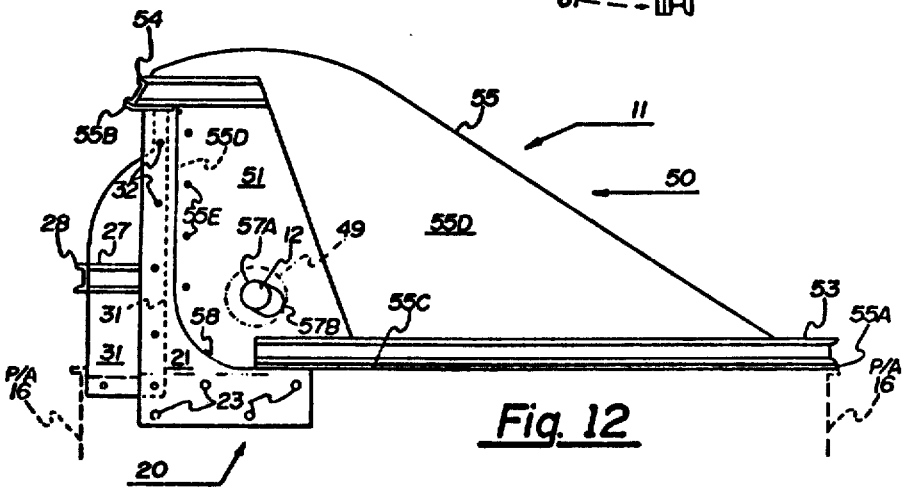
FIG. 12 is a side elevation of the lid assembly without the counterweight feature.

Referring to FIG. 12, a side elevation of the embodiment of FIG. 1 is shown without the counterweight assembly 40. This embodiment operates exactly as the embodiments described in FIGS. 1-11 with the exception that the counterweight stop pins 25, 26 and 52 have been eliminated along with the entire counterweight assembly of which necessitates the placement of spacer washer 49 in place of counterweight arm 41. With reference to FIG. 8, this will be seen as necessary to maintain the proper spacing of the rotating parts.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. A trash container lid system comprising:

a lid section having a raised back portion;

a trash bin having first and second mounting members extending upwardly therefrom;

first and second pivot slots in one of said lid section and said mounting members; and first and second axle members extending from another of said lid section and mounting members through said first and second pivot slots for rotatably and slidably coupling said lid section to said mounting members, said lid section having arcuate lower back portions on each side thereof and said pivot slots being geometrically disposed for causing said arcuate sections to frictionally engage top surfaces of said trash bin upon rotation of said lid to a partially open position.

2. The trash container lid system of claim 1 wherein said first and second axle members are pivot bolts.

3. The trash container lid system of claim 1 and further including:

first and second mounting plates extending upwardly from rear portions of inner side walls of said trash container, said rear mounting plates carrying sealing wipers in contact with inner surfaces of said lid section;

a sealing strip on the bottom surface of said lid section; and a rear liner coupled between said first and second inner plates and a rear upper section of said trash bin whereby a vapor seal is effected between said lid section and said trash bin.

4. The trash container lid system of claim 1 and further including a counterweight rotatably coupled to said axle member.

5. A trash container lid system comprising:

a lid section having a raised back portion;

a trash bin having first and second mounting members extending upwardly therefrom, said lid section being rotatably coupled to said first and second mounting members.

6. The trash container lid system of claim 5 wherein:

said lid section includes holding means operable for holding said lid in a partially open position.

7. The trash container lid system of claim 6 wherein:

said holding means includes a counterweight coupled to said lid section.

*8. A trash container lid system as defined in claim 5 further comprising:*

*means for mounting said lid section near the center of gravity of said lid section.*

*9. A trash container lid system as defined in claim 5 further comprising:*

*means for limiting the movement of said lid section as it is opened when said trash bin is in the upright orientation; and*

*means for disabling said limiting means and permitting said lid section to swing further open when said trash bin is in the upside down orientation.*

*10. A trash container lid system as defined in claim 8 wherein means are provided for mounting said lid section just below its center of gravity, whereby said lid has gravity biased forward and rear stable positions.*

*11. A trash container lid system as defined in claim 5 wherein said lid section is generally wedge shaped with said wedge leading toward said raised back portion, whereby the center of gravity of said lid section is displaced to the rear from the center of said lid section.*

*12. A trash container and lid system as defined in claim 8 wherein the portion of said lid section lying to the rear of said mounting means is greater in extent than the adjacent fixed portions of said trash container, whereby, as the lid is rotated to the rear, the rear portion of said lid section encompasses the upper rear portion of said trash container.*

*13. A trash container lid system as defined in claim 5 wherein said lid section has a non-flat geometry and is provided with side members to give rigidity to said lid section and provide additional strength to said lid section.*

*14. A system as defined in claim 12 wherein the front edge of said lid section overlies the upper edge of said trash container to make firm engagement with the front edge of said trash container when said lid section is in the closed position.*

*15. A system as defined in claim 5 further comprising:*

*first means for limiting rearward opening motion of said lid section in a partially open condition of said lid section in a partially open condition of said lid section;*

*second means for limiting rearward opening motion of said lid section in a more fully opened condition of said lid section; and*

*means for enabling said first limiting means when opening said lid with the trash container in its upright orientation and means for enabling said second limiting means when said trash bin is in the upside down orientation.*

*16. A system as defined in claim 12 wherein sealing means are provided between the inner rear edge of said lid section and the outer rear edge of said trash container as said lid section is closed.*

*17. A system as defined in claim 12 wherein the rear of said lid section is wider than the front of said lid section.*

*18. A system as defined in claim 12 wherein means are provided for sealing said lid against the escape of vapors from said trash container around the entire periphery of said lid section.*

*19. A system as defined in claim 5 further including means for permitting limited translational movement of said lid section relative to said mounting members.*

*20. A system as defined in claim 8 wherein said trash bin is a large commercial rectangular trash bin.*

*21. A system as defined in claim 9 further comprising:*

*pocket tube means secured to said trash bin for permitting the easy lifting and inverting of the trash bin and its associated lid section.*

*22. A system as defined in claim 9 further comprising external means secured to said trash bin for permitting the easy lifting and inverting of the trash bin and its associated lid section.*

*23. A trash container lid system comprising:*

*a lid section having a raised back portion;*

*a trash bin having first and second mounting members extending upwardly therefrom, said lid portion being rotatably coupled to said first and second mounting members;*

*means for mounting said lid section near the center of gravity of said lid section,*

*means for limiting the movement of said lid section as it is opened when said trash bin is in the upright orientation;*

*means for disabling said limiting means and permitting said lid section to swing further open when said trash bin is in the upside down orientation; and*

*pocket tube means secured to said trash bin for permitting the easy lifting and inverting of the trash bin and its associated lid section.*

*24. A trash container lid system comprising:*

*a lid section having a raised back portion;*

*a trash bin having first and second mounting members extending upwardly therefrom, said lid portion being rotatably coupled to said first and second mounting members;*

*means for mounting said lid section near the center of gravity of said lid section;*

*means for limiting the movement of said lid section as it is opened when said trash bin is in the upright orientation;*

*means for disabling said limiting means and permitting said lid section to swing further open when said trash bin is in the upside down orientation; and*

*external means secured to said trash bin for permitting*

*the easy lifting and inverting of the trash bin and its associated lid section.*

*25. A trash container and lid system as defined in claim 24 wherein the portion of said lid section lying to the rear of said mounting means is greater in extent than the adjacent fixed portions of said trash container, whereby, as the lid is rotated to the rear, the rear portion of said lid section encompasses the upper rear portion of said trash container.*

*26. A system as defined in claim 25 wherein sealing means are provided between the inner rear edge of said lid section and the outer rear edge of said trash container as said lid section is closed, and additional means are provided for sealing the remainder of said lid against the escape of vapors from said trash container around the entire periphery of said lid section.*

*27. A trash container lid system as defined in claim 5 further comprising:*

*means for mounting said lid section for raising with minor energy relative to the energy needed to lift said lid section pivotally about its rear edge;*

*means for providing a stabilized partially open position for said lid section when said trash container is in the upright orientation; and*

*means for facilitating opening of said lid section beyond said partially open position when said trash bin is in the upside down orientation, to empty said trash bin.*

* * * * *